UNITED STATES PATENT OFFICE.

FREDERICK J. SEYMOUR, OF FINDLAY, OHIO, ASSIGNOR TO THE AMERICAN ALUMINUM COMPANY, OF DETROIT, MICHIGAN.

METHOD OF OBTAINING ALUMINA FROM CLAY.

SPECIFICATION forming part of Letters Patent No. 382,197, dated May 1, 1888.

Application filed May 16, 1887. Serial No. 238,298. (Specimens.)

*To all whom it may concern:*

Be it known that I, FREDERICK J. SEYMOUR, a resident of Findlay, in the county of Hancock and State of Ohio, have invented certain new and useful Improvements in Method for Obtaining Alumina from Clay, of which the following is a specification.

My invention relates to the art of producing alumina from clay or aluminous earths. Alumina can be separated from the silica readily by the use of a deoxidizing agent and a flux when subjected to the heat of about 1,800° or 2,000° Fahrenheit; but the alumina thus separated is very light and easily carried off and lost.

My invention relates, principally, to the employment of a volatile metal or metallic oxide to gather, hold, and carry down the alumina thus separated. I have found that any metal whose atomic weight is heavier than that of aluminum with which aluminum readily alloys may be employed to gather alumina for further reduction and treatment, and that a comparatively small amount of such heavier metal is required to prevent the escape of the alumina and secure its deposition in a condensing or collecting chamber.

In my application filed April 25, 1887, Serial No. 235,962, styled "Case 4," I have described and claimed the process of reducing alumina in the presence of zinc. In my present application I desire to claim, broadly, the use of any metal of the character described to gather and collect for further treatment the alumina when separated, as above set forth. For this purpose the furnace described in my said application may be conveniently employed. Copper may be used as one of the metals for this purpose in the following manner:

Take clay composed, for example, of sixty parts of alumina to forty parts of silica, one hundred parts; pulverized carbon, forty parts; flux—such as common salt, carbonate of potassium, or sal-ammoniac salt—two to five parts; copper, thirty to thirty-five parts. It is preferred to have the copper granulated; but, instead of granulated copper, copper oxides or copper ores may be employed, or copper salts. These substances, being mixed in a finely-divided condition, are subjected to the action of burning gas in the furnace and to from about 2,500° to 3,500° Fahrenheit, and a mixture of vapors or oxides or light finely-divided materials will be produced. The silica will be deposited more rapidly than the metallic vapors or oxides, and so much as escape from the heating-chamber are cooled and collected in a chamber or conduit provided for the purpose, and the alumina and copper are carried forward, cooled, and condensed, and deposited in the form of powder or oxides. These oxides may then be reduced to the metallic state by heat and any suitable flux and a deoxidizing agent.

In lieu of copper, tin may be employed at a much lower heat but with a less degree of efficiency. The amount of tin should be about forty to sixty per cent. of alumina.

Having thus described my invention, what I claim is—

1. The process of separating alumina from clay or aluminous earth, which consists in mixing the clay or earth with a deoxidizing agent and a flux, and with copper or other metal of greater specific and atomic weight than aluminum, heating the mixture to produce a mixture of finely-divided materials and oxides, and then cooling, condensing, and collecting the same, substantially as specified.

2. The process of separating alumina from clay or aluminous earth, which consists in mixing the clay or earth with a deoxidizing agent and a flux, and with copper or other metal of greater specific and atomic weight than aluminum, heating the mixture, cooling the mingled oxides that pass from the heating-chamber, separately condensing and collecting silica, and, finally, cooling and collecting alumina mingled with the other metallic oxide, substantially as specified.

In testimony whereof I have hereunto set my hand.

FREDERICK J. SEYMOUR.

Witnesses:
   M. M. WHITELEY,
   Y. BICKHAM.